United States Patent
Walls et al.

(10) Patent No.: US 9,083,653 B2
(45) Date of Patent: Jul. 14, 2015

(54) AUTOMATED CLOUD SET UP

(71) Applicant: HEWLETT-PACKARD DEVELOPMENT COMPANY, L.P., Houston, TX (US)

(72) Inventors: Jeffrey Joel Walls, Fort Collins, CO (US); Mark Perreira, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 5 days.

(21) Appl. No.: 14/058,939

(22) Filed: Oct. 21, 2013

(65) Prior Publication Data

US 2015/0113145 A1    Apr. 23, 2015

(51) Int. Cl.
*G06F 15/173* (2006.01)
*H04L 12/911* (2013.01)
*H04L 12/24* (2006.01)
*H04L 29/08* (2006.01)

(52) U.S. Cl.
CPC ............ *H04L 47/70* (2013.01); *H04L 41/0803* (2013.01); *H04L 41/0876* (2013.01); *H04L 41/14* (2013.01); *H04L 41/50* (2013.01); *H04L 29/08144* (2013.01); *H04L 41/044* (2013.01); *H04L 41/22* (2013.01)

(58) Field of Classification Search
CPC ............ H04L 29/08144; H04L 41/044; H04L 41/0803; H04L 41/0876; H04L 41/14; H04L 41/22
USPC ................... 709/203, 220, 226, 246
See application file for complete search history.

(56) References Cited

U.S. PATENT DOCUMENTS

| 8,335,851 | B1* | 12/2012 | Vendrow ..................... 709/226 |
| 8,566,838 | B2* | 10/2013 | Sabin et al. ................. 718/105 |
| 2007/0168919 | A1 | 7/2007 | Henseler et al. |
| 2010/0061250 | A1* | 3/2010 | Nugent ....................... 370/242 |
| 2012/0066670 | A1 | 3/2012 | McCarthy et al. |
| 2012/0124211 | A1 | 5/2012 | Kampas et al. |
| 2012/0233625 | A1* | 9/2012 | Sabin et al. ................. 718/105 |
| 2012/0311111 | A1 | 12/2012 | Frew et al. |
| 2013/0111034 | A1 | 5/2013 | Upadhya |
| 2013/0191528 | A1 | 7/2013 | Heninger et al. |
| 2013/0211546 | A1 | 8/2013 | Lawson et al. |
| 2014/0165060 | A1* | 6/2014 | Muller et al. ..................... 718/1 |
| 2014/0278808 | A1* | 9/2014 | Iyoob et al. ................. 705/7.35 |
| 2014/0279201 | A1* | 9/2014 | Iyoob et al. ................. 705/26.7 |
| 2014/0280961 | A1* | 9/2014 | Martinez et al. ............. 709/226 |
| 2014/0324647 | A1* | 10/2014 | Iyoob et al. ..................... 705/30 |
| 2014/0365662 | A1* | 12/2014 | Dave et al. .................... 709/226 |

OTHER PUBLICATIONS

Bloomberg, J., Cloud Configuration Management: Where the Rubber Hits the Clouds; Jan. 25, 2012; 4 Pages. http://www.zapthink.com/2012/01/25/cloud-configuration-management-w.
Eucalyptus Systems, Eucalyptus 3.3.1 User Guide, Jun. 21, 2013, 100 pages http://www.eucalyptus.com/docs/eucalyptus/3.3/user-guide/.

* cited by examiner

*Primary Examiner* — Michael Y Won
(74) *Attorney, Agent, or Firm* — Van Cott, Bagley, Cornwell & McCarthy

(57) ABSTRACT

Automated cloud set up may include collecting compute resources available for setting up a cloud, identifying packages available to apply to the compute resources, and determining which subsets of the packages to apply to which compute resource.

20 Claims, 5 Drawing Sheets

AUTOMATED CLOUD SET UP

BACKGROUND

A cloud is a group of computing devices connected through a real-time communication network, such as the internet, that are organized to perform network based services. The cloud may employ the use of physical computing devices or virtual devices. The resources of the computing devices are shared to maximize efficiencies. The cloud can operate to run programs remotely on client devices, store an enormous amount of data, perform complex tasks, and other functions.

A cloud can be set up manually. In such a case, the user can take all of the raw packages, such as operating systems, program instructions, or downloaded information, from a repository, like OpenStack. Then the user can build and install the packages as desired. Next, the user can install and configure the packages on the correct computing device and then prepare those computing devices for operation in the cloud.

BRIEF DESCRIPTION OF THE DRAWINGS

The accompanying drawings illustrate various examples of the principles described herein and are a part of the specification. The illustrated examples are merely examples and do not limit the scope of the claims.

FIG. 1 is a diagram of an example of a set up system according to the principles described herein.

DETAILED DESCRIPTION

Some programs have been developed to assist with the creation of a cloud. Such programs include Chef, Crowbar, and JuJu. All of these approaches try to simplify setting up a cloud, but each still relies on the user or a community of users to create a specification for each service to be performed by the cloud. In Crowbar, the specification is called a barclamp, and in JuJu, the specification is called a charm. These are complicated elements that take time to create. Once created, the specifications still have to be applied to each cloud device and manually instantiated, configured, and deployed one at a time.

The process of defining and standing up a cloud is labor intensive, error prone, and time consuming. The process involves many tasks. First, the cloud administrator has to specify which compute resources (nodes) will be included in the cloud. The next task is to decide which nodes will be used as "controllers" and which nodes will be purposed for compute, storage, or other functions. Once the nodes have been assigned roles, a series of packages have to be installed on the correct nodes. For example, nodes assigned a controller role will have a different set of packages than a node assigned a compute or storage role. For each package, a series of attributes have to be specified. Once the attributes have been selected for each package, the packages have to be applied in the correct order.

Creating a cloud is a very complicated process. If you were to take raw packages from OpenStack and then provision them into a cloud, it would take many days and a lot of assistance to prepare everything correctly. Each service has its own mechanism for configuring itself and the details of this configuration can be low level and involve intimate knowledge of the system and the service.

The principles described herein simplify the entire process of cloud setup. In the simplest case, the process of automating a cloud can be completed with fewer than ten mouse clicks. The principles described herein involve examining the available compute resources (nodes) and the packages available and then automatically applying the correct packages to the right nodes. Attribute specification is also greatly simplified in that default values are used where possible and just those attributes that make sense to be overridden can be.

The principles described herein include a method for automated cloud set up. Such a method may include collecting compute resources available for setting up a cloud, identifying packages available to apply to the compute resources, and determining which subsets of the packages to apply to which compute resource. The compute resources may be nodes or other components used to run the operations of the cloud. The packages may include operating systems, program instructions, or other downloadable information to operate the compute resources.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

FIG. 1 is a diagram of an example of a set up system (100) according to the principles described herein. In this example, the set up system (100) discovers nodes (102, 104, 106) that can be used in a cloud (108). The cloud (108) is a group of computing resources, such as the nodes (102, 104, 106) that are organized together to carry out at least one function. Each of the nodes (102, 104, 106) can be assigned specific roles within the cloud (108) to carry out the cloud's tasks.

The set up system (100) can initiate an automated cloud set up procedure that involves a minimal amount of user input. For example, the set up system (100) can discover the nodes (102, 104, 106) that are available to be part of the cloud. The set up system (100) can automatically pre-initialize these nodes (102, 104, 106) so that they are visible to the rest of the system. In some examples, the set up system (100) can recognize that a discovered node has parameters that are incompatible with the cloud (108). In such a situation, the set up system (100) will not pre-initialize the node.

In response to pre-initializing a node, the set up system (100) can seek user input to determine whether the user wants to include the node in the cloud. The set up system (100) can seek user input through any appropriate mechanism. In some examples, the set up system (100) uses a communication mechanism that will involve minimal interaction from the user. For example, the communication mechanism may involve displaying a message on a screen of a user interface that identifies the node in question and asks if the user wants to include that node in the cloud (108). The message may be accompanied with a first button that indicates that the user wants to include the node and a second button that indicates that the user does not want to include the node.

If the user wants to include the node in the cloud, the set up system will complete the initialization procedure so that the node can be assigned roles within the cloud (108). In such a condition, the node can have general purpose machine readable instructions that are specific to the cloud (108). Thus, the node is capable of operating within the cloud (108), but at this point does not have an assignment.

In response to having a node without a role, the set up system (100) can request input from the user for which type of role to assign the node. Again, such a communication may include any appropriate communication mechanism. In some examples, the set up system (100) determines which roles are suitable for the node based on the node's attributes and recommends just those roles that are compatible for such a node. In determining which roles to assign to a node, the set up system (100) can determine which roles are underperforming in the cloud (108), which roles can take advantages of the characteristics of the node, other factors, or combinations thereof. In the example of FIG. 1, the set up system (100) includes a roles table (110), which contains the types of roles that are available for nodes or other computing devices in the cloud (108). Such a roles table (110) can include attributes that are compatible with computing resources, such as memory attributes, processing speed attributes, other types of attributes, or combinations thereof. The set up system (100) can determine based on the information in the roles table (110) which roles are appropriate to assign to the node. In the example of FIG. 1, the roles in the role table include a network controller role (112), a cloud controller role (114), a storage controller role (116), and another type of role (117). While this example has been described with reference to specific types of roles, any appropriate type of role may be used in accordance with the principles described herein.

In response to determining which type of role is appropriate for the node, the set up system can seek user input to determine which role to assign to the node. In response to receiving input from the user, the set up system (100) can determine which package to install on the node based on its role. The set up system (110) may include a group of packages (118), each package being a subset of the packages that are available for each node. The packages (118) may include operating systems, program instructions, other machine readable instructions, other types of information, or combinations thereof that the node can use to properly operate within its function. In response to determining which role to assign the node, the set up system can automatically install the appropriate package onto the node. In this manner, the user is spared from making a manual determination of which packages are available for a node of a specific role and also spared from manually initializing the installation for each portion of the package that should be downloaded to a node of that particular role.

Further, the set up system (100) can seek user input for which region to assign the role. The cloud (108) may include multiple regions that duster specific nodes to perform operations together. Such regions may be based on geographic regions, logical regions, task oriented regions, regions based on other criteria, or combinations thereof. In examples where the cloud (108) is first being established, the cloud (108) may not have any regions yet established. In such examples, the set up system may request input from the user for establishing a region. Then, as nodes are assigned roles, the set up system (100) can seek input from the user for which region to assign the nodes.

In the example of FIG. 1, the set up system (100) has a regions table (120), which tracks the regions in the cloud (108). Such a regions table (120) may include an identifier for each of the regions, an identifier for each of the nodes assigned to the region, types of computing resources desired for each region, other types of information, or combinations thereof.

The principles described herein can eliminate multiple set up tasks for the user to perform and thereby eliminate potential manual errors that a user often encounters in cloud creation. The first task in cloud creation is node collection. Here, nodes are discovered and allocated for general purposes. Along the cloud creation process, each node can be classified into one of the following categories: initial state, ready for allocation, allocated, and deployed. A node can be booted into the set up system (100) in a preboot execution environment (PXE) that is independent of the node's installed operating system. Before a node is PXE-booted, the node is classified in the initial state and is not visible to the set up system (100). Once the system has recognized and pre-initialized the node, the node is classified in the ready for allocation category. Here, the user can decide to complete the setup of this node. If the user desires to complete the node's set up, a complete and custom operating system is installed onto the node, and the node is classified in the allocated category. When a node is classified as allocated, the node is ready to be used in the cloud (108). Nodes that are being used in a cloud are classified in the deployed category.

Once a set of nodes are allocated, a cloud can be created. The user provides a specification at this point by choosing what role a node should play. Depending upon the user's cloud parameters, a single node or set of nodes can fulfill multiple roles. For example, a single node can act as a cloud controller, a network controller, and a network controller. However any combinations of nodes may be employed to fulfill multiple roles or a single role. Once the nodes have been specified, a minimal set of attributes can be modified. In some examples, the node's attributes can be left alone if the node's default attributes are sufficient.

The user then builds the cloud and the set up system (100) goes through the process of preparing the packages and installing them to the appropriate nodes. In response to the creation of a cloud, the user can specify and create compute regions, storage regions, other types of regions, or combinations thereof that are to be associated with the cloud. In some examples, the process for region creation is identical to cloud creation.

Such processes can be implemented as an abstraction on top of any existing technology, including Chef, Crowbar, JuJu, or other programs. Chef is an automation platform that is available through Opscode, Inc., which has operations in Seattle, Wash., U.S.A. Crowbar is an automation platform that is available through Dell, Inc, which headquartered in Round Rock, Tex., U.S.A. JuJu is an orchestration tool that is available through Canonical Ltd., which has operations in London, United Kingdom.

In some examples that build off of Crowbar, the barclamp writer can specify two things: that the Crowbar specifications (barclamps) are included in the suite of packages and which node types apply to the barclamp role. The node types can be: cloud controller, network controller, storage controller, compute controller, compute node, storage node, another role, or combinations thereof. With this information, the set up system (100) can determine which packages and configurations should be installed on which nodes. Thus, the automation can proceed with no further user input.

The principles described herein provide a very simple mechanism to set up a cloud from the user's side. Further, such a mechanism is very fast compared to other commercially available programs that assist the user in creating clouds. The principles herein allow a user to get an operational cloud in about fifteen minutes from the time that the user has obtained a set of allocated nodes. The principles herein also provide a robust cloud creation mechanism. A vast majority of errors that are often in cloud creation are eliminated. Further, the set up system (100) allows multiple independent clouds to be created easily as well as to set up multiple compute and/or storage regions associated with the individual clouds.

Figure 2A:
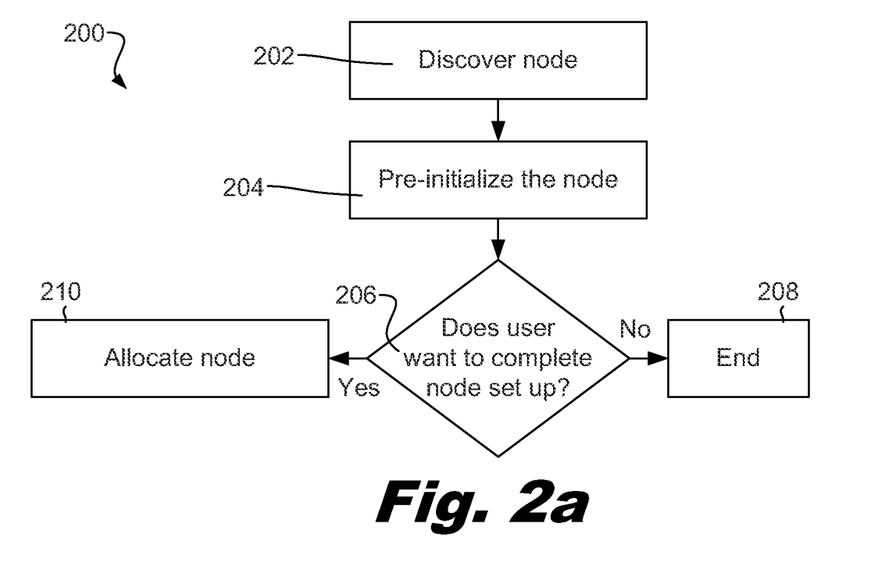
FIG. 2a is a diagram of an example of a process for automated cloud set up according to the principles described herein.

FIG. 2a is a diagram of an example of a process (200) for automated cloud set up according to the principles described herein. In this example, the process (200) includes discovering (202) a node and pre-initializing (204) the node. The process (200) also includes determining (206) whether the user wants to complete the node's set up. If the user does not want to complete the set up, the process ends (208). On the other hand, if the user wants to complete the node's set up, the process (200) includes allocating (210) the node.

Figure 2B:
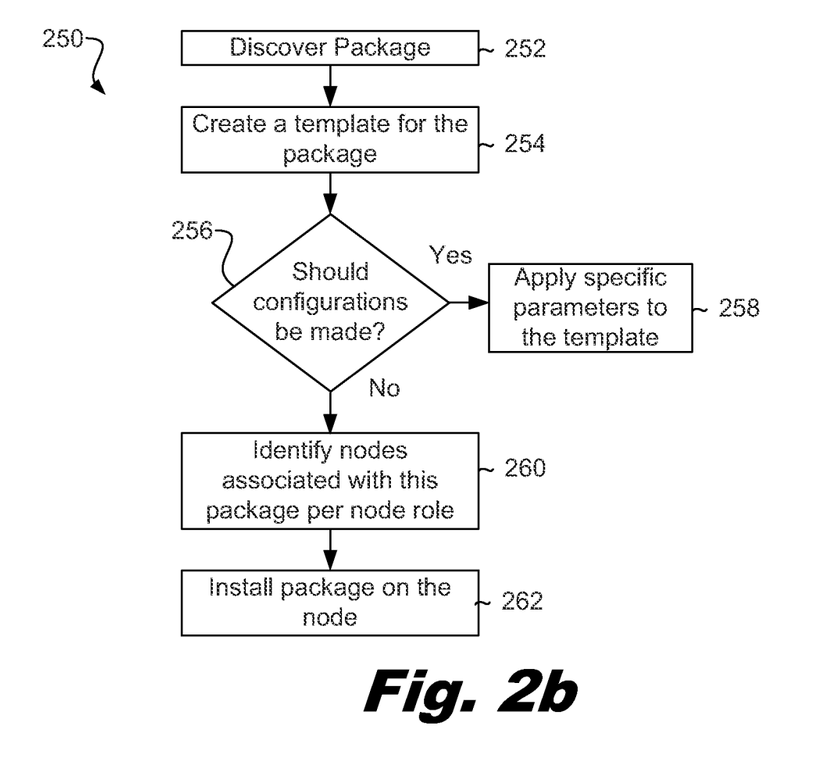
FIG. 2b is a diagram of an example of a process for automated cloud set up according to the principles described herein.

FIG. 2b is a diagram of an example of a process (250) for automated cloud set up according to the principles described herein. In this example, the process (250) includes discovering (252) a package and creating (254) a template for the package. The process (250) also includes determining (256) configurations should be made to the template. If so, specific parameters are applied (258) to the template. The process (250) continues by identifying (260) nodes associated with this package per node role and installing (262) the package on the node.

Figure 3:
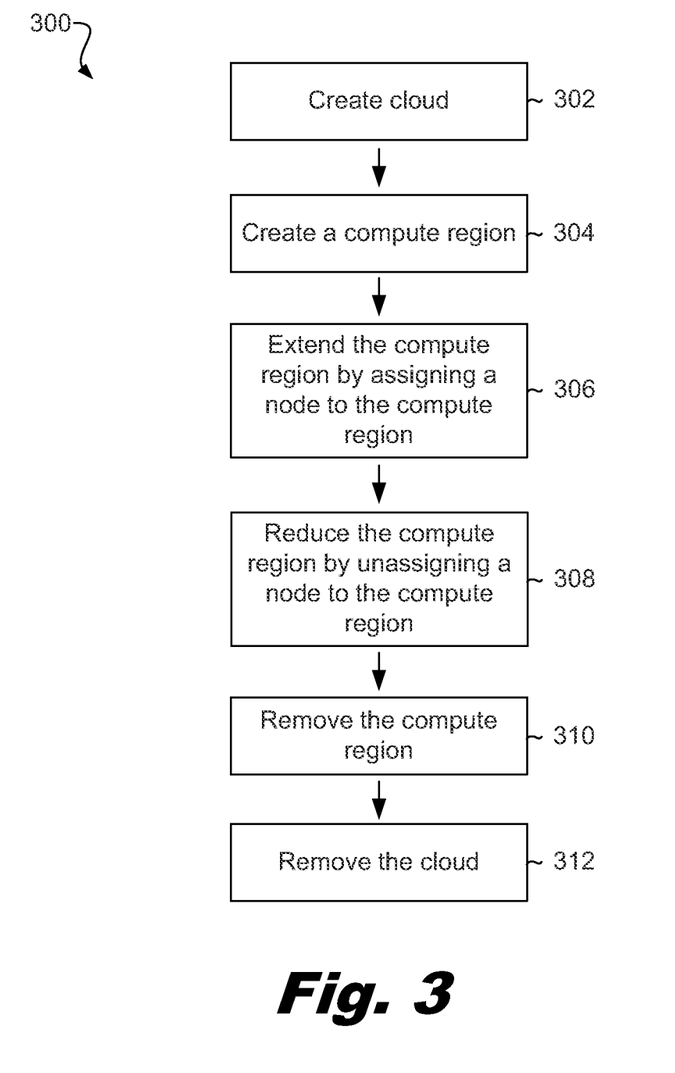
FIG. 3 is a diagram of an example of a process for developing a region of a cloud according to the principles described herein.

FIG. 3 is a diagram of an example of a process (300) for developing a region of a cloud according to the principles described herein. In this example, the user has an ability to create a cloud and/or a region. Likewise, the user has an ability to remove a region of the cloud or remove the cloud itself. In some examples, the user can extend and reduce the regions simultaneously. Likewise, the user can extend and/or reduce the regions multiple times.

The process (300) includes creating (302) a cloud. Here, the cloud is a framework in which nodes and regions can be added such that the nodes can operate together based on their roles to accomplish predetermined tasks, such as remote network services. Further, the process (300) includes creating (304) a compute region. The region can be extended (306) by assigning a node to the compute region. Likewise, the compute region can be reduced (308) by unassigning a node to the compute region. While this example has been described with specific reference to creating, modifying, and removing compute regions, any appropriate type of region may be created, modified, or removed. For example, the regions may be storage regions, other types of regions, or combinations thereof.

Further, the user can instruct the set up system to remove (310) the compute region. Likewise, the user can instruct the set up system to remove the cloud.

Figure 4:
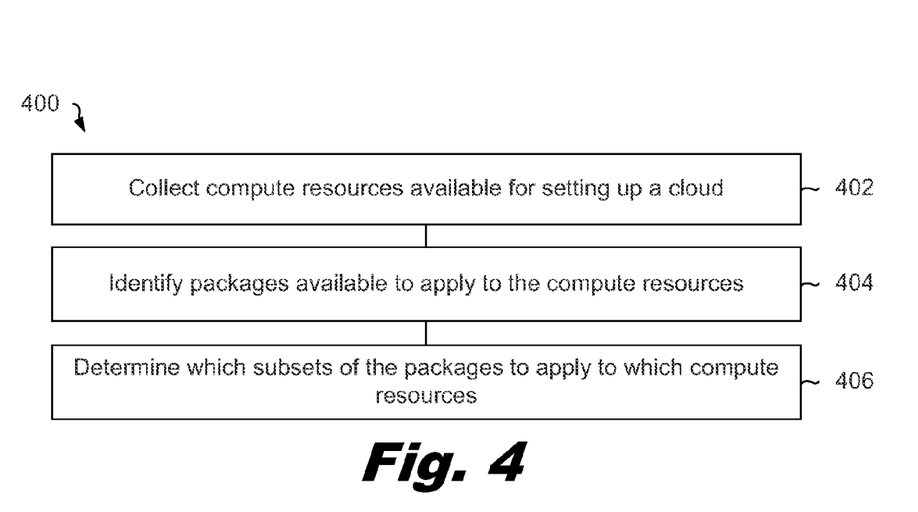
FIG. 4 is a diagram of an example of a method for automated cloud set up according to the principles described herein.

FIG. 4 is a diagram of an example of a method (400) for automated cloud set up according to the principles described herein. In this example, the method (400) includes collecting (402) compute resources available for setting up a cloud, identifying (404) packages available to apply to the compute resources, and determining (406) which subsets of the packages to apply to which compute resources.

The user will be able to create and organize a cloud in a user interface. The user interface may present user friendly buttons, free text fields, and other mechanism that allow the user to interact with the set up system. The information requests for the user may be limited to just specific questions that cannot be determined by the set up system alone. The principles described herein may reduce the time and complexity, from the user's side, for setting up of the cloud.

In some examples, a node will be set up with PXE-boot in response to a compute resource being introduced into the set up system. The set up system may include a server which such PXE booting capabilities. In response to the new compute resource being powered on, the node will search for a PXE server and this server will give the node the correct operating system image to install. At this time, an administrative node takes notice of the new node and tracks the new node continually. Once the node has received a base operating system from the set up system, the new node is classified as in a not allocated category. In this classification, the node is unable to be used in the cloud, so the user will allocate the node by clicking an allocate node button. In examples where the crowbar program is used with the set up system, during this process, crowbar will install a different operating system on the node and then will apply a series of barclamps to prepare the node for usage as an element of a cloud.

In some examples, the user can change multiple parameters about the node at any time desired by the user. For example, the user may be able to change the node's alias or its description. The alias may replace a serial number or other type of identifier in the user interface. The user may want to make the alias a user friendly name so that the user can easily identify the node based on the alias. The alias may be a word that can be used as a system hostname. The description may be changed in a free form description field with a limited number of characters.

In some examples, to create a cloud, the user can click a create cloud button on the manage cloud's page. This action raises a create cloud dialog where the user can specify the name of the cloud, which can also be a domain name that is used to initialize other programs. This dialog also lets the user specify the nodes that will be used in the cloud controller role, network controller role, storage controller role, or other role.

An additional information button can be used to fill in properties about the cloud to be created. The user may input information in response to selecting this button that guide the set up system in creating the cloud.

In response to a user selecting a create cloud button, the set up system will go through a series of tasks to create an active cloud automatically. However, in some examples, no compute regions, storage regions, or other types of regions are established automatically at this stage. The compute region, storage regions, or other types of regions can be added to a cloud at any time based on user input after the cloud has been created. A create compute region dialog can be displayed in the user interface in response to a request from a user to create the compute region. Within this dialog, the user can specify the name of the compute region and additional information about the region. Also, another additional information tab can be used to fill in properties by the user for building the compute region.

If at least one compute region already exists when a new node is brought into the set up system, the new node can be assigned to one of those regions through the use of extend compute region buttons or other mechanisms. In some examples, to add nodes to a compute region, the user may specify which compute region will be extended and then will select the compute nodes to be added to the selected compute region. In some examples, a node that is already assigned to first region may be removed from its currently assigned region to be reassigned to another region. However, in some examples, if a compute node is assigned a role as a controller, that node cannot be removed from the region without completely removing the region.

If the user wants to completely remove a compute region, the user may accomplish this using with a remove compute region button or similar mechanism. In such an example, the user may select which compute region to remove and then type the remove command in an appropriate validation field.

Likewise, if the user wants to completely remove a cloud, the user may select a remove cloud button or activate the cloud removal through another type of mechanism. Here, the set up system may request that the user input a remove command in an appropriate validation field to ensure that the cloud is not unintentionally removed.

In some examples, the user may view more detail about a cloud by clicking the cloud's name in the user interface or through another type of mechanism. In response to such a selection, details about the cloud, the cloud's resources, the cloud's regions, the cloud's identifier, the cloud's alias, other information about the cloud, or combinations thereof may appear in a screen of the user interface. Likewise, a user may be able to click a node's name or a region's name to view details for that node or region.

Figure 5:
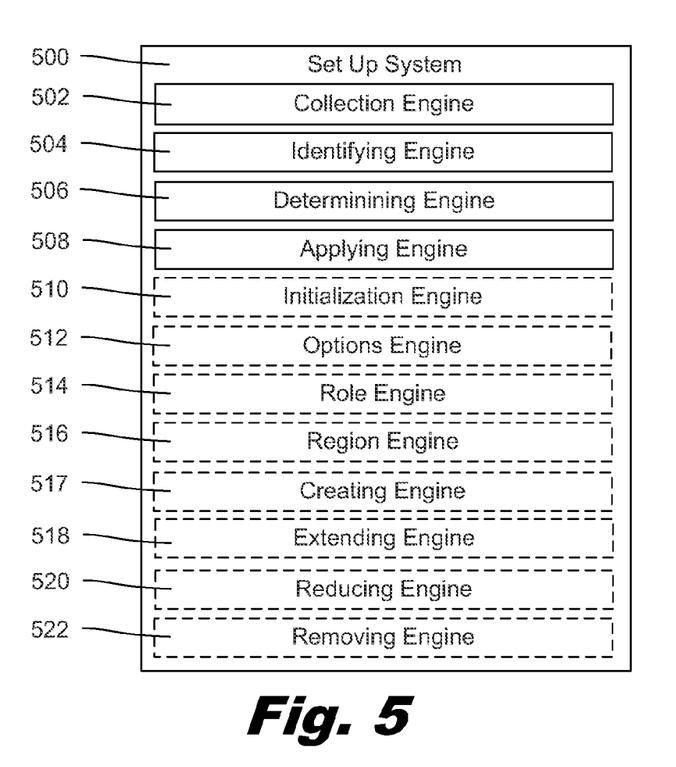
FIG. 5 is a diagram of an example of a set up system according to the principles described herein.

FIG. 5 is a diagram of an example of a set up system (500) according to the principles described herein. The set up system (500) includes a collection engine (502), an identifying engine (504), a determining engine (506), and an applying engine (508). In this example, the set up system (500) also includes an initialization engine (510), an options engine (512), a role engine (514), a region engine (516), a creating engine (517), an extending engine (518), a reducing engine (520), and a removing engine (522). The engines (502, 504, 506, 508, 510, 512, 514, 516, 517, 518, 520, 522) refer to a combination of hardware and program instructions to perform a designated function. Each of the engines (502, 504, 506, 508, 510, 512, 514, 516, 517, 518, 520, 522) may include a processor and memory. The program instructions are stored in the memory and cause the processor to execute the designated function of the engine.

The collecting engine (502) collects the nodes that are to be included in the cloud. The process of collecting may include node discovery. The initialization engine (510) pre-initializes the discovered node. The identifying engine (504) identifies packages available to apply to the nodes, and the determining engine (506) determines which subsets of the packages to apply to which of the nodes. The applying engine (508) applies the selected subsets of the packages to the appropriate nodes.

The options engine (512) provides options to the user through a user interface to guide the user in providing input about how to build the cloud. For example, the options engine (512) may provide options to complete the set up of a node, which role to apply to which node, whether to create a region, whether to extend a region, whether to reduce a region, whether to remove a region, other options, or combinations thereof.

The role engine (514) assigns a role to the node based on user input. The region engine (516) assigns a region to a node based on user input. The creating engine (517) creates a region based on user input. The extending engine (518) extends a region by adding new nodes to the region based on user input. The reducing engine (520) removes nodes from a region based on user input. The removing engine (522) removes a region based on user input.

Figure 6:
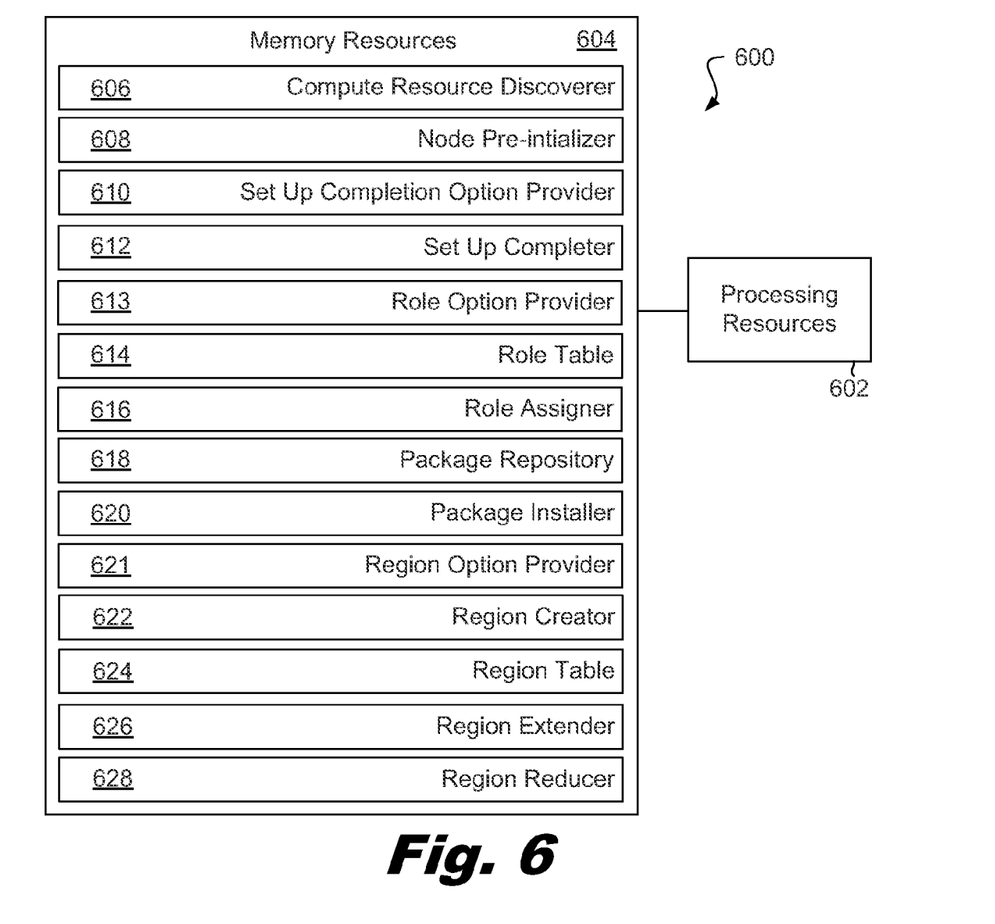
FIG. 6 is a diagram of an example of a set up system according to the principles described herein.

FIG. 6 is a diagram of an example of a set up system (600) according to the principles described herein. In this example, the set up system (600) includes processing resources (602) that are in communication with memory resources (604). Processing resources (602) include at least one processor and other resources used to process programmed instructions. The memory resources (604) represent generally any memory capable of storing data such as programmed instructions or data structures used by the set up system (600). The programmed instructions shown stored in the memory resources (604) include a compute resource discoverer (606), a node pre-initializer (608), a set up completion option provider (610), a set up completer (612), a role options provider (613), a role assigner (616), a package installer (620), a region option provider (621), a region creator (622), a region extender (626), and a region reducer (628). The data structures shown stored in the memory resources (604) include a role table (614), a package repository (618), and a region table (624).

The memory resources (604) include a computer readable storage medium that contains computer readable program code to cause tasks to be executed by the processing resources (602). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable program read only memory, magnetic storage media, other types of memory, or combinations thereof.

The compute resource discoverer (606) represents programmed instructions that, when executed, cause the processing resources (602) to discover compute resources available for creating or modifying a cloud. The node pre-initializer (608) represents programmed instructions that, when executed, cause the processing resources (602) to pre-initialize discovered nodes. The set up completion option provider (610) represents programmed instructions that, when executed, cause the processing resources (602) to provide an option to complete the set up of a node. The set up completer (612) represents programmed instructions that, when executed, cause the processing resources (602) to complete the node's set up based on user input.

The role option provider (613) represents programmed instructions that, when executed, cause the processing resources (602) to provide an option for which role to assign to a node. The role option provider (613) may provide an option for just those roles that would be compatible with a node. In some examples, the role option provider (613) provides a recommendation for which role to assign a node based on the performance of the cloud. The role options provider (613) may consult with the role table (614) when presenting the role options to the user. The role assigner (616) represents programmed instructions that, when executed, cause the processing resources (602) to assign roles to nodes based on user input. The package installer (620) represents programmed instructions that, when executed, cause the processing resources (602) to install the appropriate packages from the package repository (618) based on the role assigned to the node.

The region option provider (621) represents programmed instructions that, when executed, cause the processing resources (602) to provide an option for where to assign the node. The option may include an option to create a region, extend a region, reduce a region, or combinations thereof. The region table (624) tracks which nodes are assigned to which regions. The region creator (622) represents programmed instructions that, when executed, cause the processing resources (602) to create a region based on user input. The region extender (626) represents programmed instructions that, when executed, cause the processing resources (602) to extend a region by adding a node to the region based on user input. The region reducer (628) represents programmed instructions that, when executed, cause the processing resources (602) to reduce a region by removing a node from the region based on user input.

Further, the memory resources (604) may be part of an installation package. In response to installing the installation package, the programmed instructions of the memory resources (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (602) and the memory resources (604) are located within the same physical component, such as a server, or a network component. The memory resources (604) may be part of the physical component's main memory, caches, registers, non-volatile memory, or elsewhere in the physical component's memory hierarchy. Alternatively, the memory resources (604) may be in communication with the processing resources (602) over a network. Further, the data structures, such as the libraries and may be accessed from a remote location over a network connection while the programmed instructions are located locally. Thus, the set up system (600) may be implemented on a user device, on a server, on a collection of servers, or combinations thereof.

The set up system (600) of FIG. 6 may be part of a general purpose computer. However, in alternative examples, the set up system (600) is part of an application specific integrated circuit.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A computer program product for automated cloud set up, comprising:
a non-transitory computer readable storage medium that comprises program instructions that, when executed, causes a processor to:
collect compute resources available for setting up a cloud;
present to a user a number of roles that are suitable for a node of said compute resource based on compatibility between a role and attributes of said node;
receive selection of a role from the number of roles for assignation to said node;
identify packages available to apply to said node; and
determine which subsets of said packages to apply to which node based on a selected role.

2. The computer program product of claim 1, further comprising program instructions that, when executed, causes said processor to automatically apply one of said subsets to said node.

3. The computer program product of claim 1, further comprising program instructions that, when executed, causes said processor to:
make said node of said compute resources visible; and
install a base operating system on said node.

4. The computer program product of claim 3, further comprising program instructions that, when executed, causes said processor to provide a user with an option to complete a set up of said node.

5. The computer program product of claim 4, further comprising program instructions that, when executed, causes said processor to complete a set up of said node in response to user input selecting said option to complete said set up, in which completion of a set up comprises:
installing a custom operating system onto said node; and
classifying said node as in an allocated category.

6. The computer program product of claim 3, further comprising program instructions that, when executed, causes said processor to assign a role to said node.

7. The computer program product of claim 6, wherein said role is a cloud controller role, a network controller role, a storage controller role, or combinations thereof.

8. The computer program product of claim 3, further comprising program instructions that, when executed, causes said processor to assign said node to a region within said cloud, in which:
nodes within a region perform operations together; and
an assignment is based on said role of said node.

9. A system for automated cloud set up, comprising:
a collection engine to collect compute resources available for setting up a cloud;
a roles table to identify roles that are assignable to a node of said compute resources based on attributes of said node;
an identifying engine to identify packages available to apply to said node;
a determining engine to determine which subsets of said packages to apply to which node based on user selection of a role from said roles table; and
an applying engine to automatically apply one of said subsets to said node based on said role.

10. The system of claim 9, further comprising an initialization engine to:
make said node of said compute resources visible; and
classify said node as ready for allocation.

11. The system of claim 9, further comprising an options engine to provide options to a user for processing said node in said compute resources.

12. The system of claim 9, further comprising a role engine to assign said role to said node of said compute resources based on user input.

13. The system of claim 9, further comprising a region engine to assign a region to said node of said compute resources based on said user selection of said role from said roles table.

14. The system of claim 9, further comprising a regions table to track regions in said cloud, in which said regions table indicates types of compute resources desired for said regions.

15. A method of automated cloud set up, comprising:
collecting compute resources available for setting up a cloud;
determining a number of roles that are assignable to a node of said compute resource based on compatibility between a role and attributes of said node;
presenting the number of roles to a user;
receiving selection of a role from said number of roles for assignation to said node;

identifying packages available to apply to said node based on a selected role;

assigning said role to said node of said compute resources;

determining which subsets of said packages to apply to said node based on an assigned role;

automatically applying one of said subsets to said node based on said assigned role; and assigning said node to an operating region based on said assigned role, in which said node performs operations together with other nodes in said operating region.

16. The computer program product of claim 1, in which said attributes of said node comprise at least one of memory attributes and processing speed attributes.

17. The computer program product of claim 1, in which presenting to a user a number of roles that are suitable for a node of said compute resource is further based on a performance of said cloud.

18. The method of claim 15, wherein determining a number of roles that are assignable to a node of said compute resources is further based on a performance of said cloud.

19. The method of claim 15, in which assigning said node to an operating region based on said assigned role comprises creating said region.

20. The method of claim 15, in which assigning said node to an operating region based on said assigned role comprises extending said region.

* * * * *

UNITED STATES PATENT AND TRADEMARK OFFICE
CERTIFICATE OF CORRECTION

PATENT NO. : 9,083,653 B2
APPLICATION NO. : 14/058939
DATED : July 14, 2015
INVENTOR(S) : Jeffrey Joel Walls et al.

It is certified that error appears in the above-identified patent and that said Letters Patent is hereby corrected as shown below:

In the drawings

In Sheet 4 of 5, in Fig. 5, reference numeral 506, line 1, delete "Determinining" and insert -- Determining --, therefor.

In the specification

In Column 3, line 61, delete "duster" and insert -- cluster --, therefor.

Signed and Sealed this
Eighth Day of March, 2016

Michelle K. Lee
*Director of the United States Patent and Trademark Office*